United States Patent
Hanson

[11] 3,839,906
[45] Oct. 8, 1974

[54] APPARATUS FOR ENGINE COMPRESSION TESTING

[75] Inventor: Richard Eric Hanson, Woburn, Mass.

[73] Assignee: RCA Corporation, New York, N.Y.

[22] Filed: Oct. 9, 1973

[21] Appl. No.: 404,802

[52] U.S. Cl. .................................................. 73/115
[51] Int. Cl. ......................................... G01m 15/00
[58] Field of Search.................... 73/115, 117.2, 116

[56] References Cited
UNITED STATES PATENTS
3,765,233  10/1973  Germann ........................... 73/117.2

Primary Examiner—Jerry W. Myracle
Attorney, Agent, or Firm—Edward J. Norton; Carl V. Olson

[57] ABSTRACT

An engine compression fault detector includes means for detecting engine cylinder compression peaks from the starter motor current waveform. Each engine peak is compared to a dynamic peak reference which is derived from and related to the maximum cylinder peak of the engine under test. An output circuit provides a missing or low peak indication if the peak reference exceeds any cylinder peak. Overall engine compression evaluation is accomplished by comparing the difference of the average and peak starter current to a predetermined reference signal.

10 Claims, 4 Drawing Figures

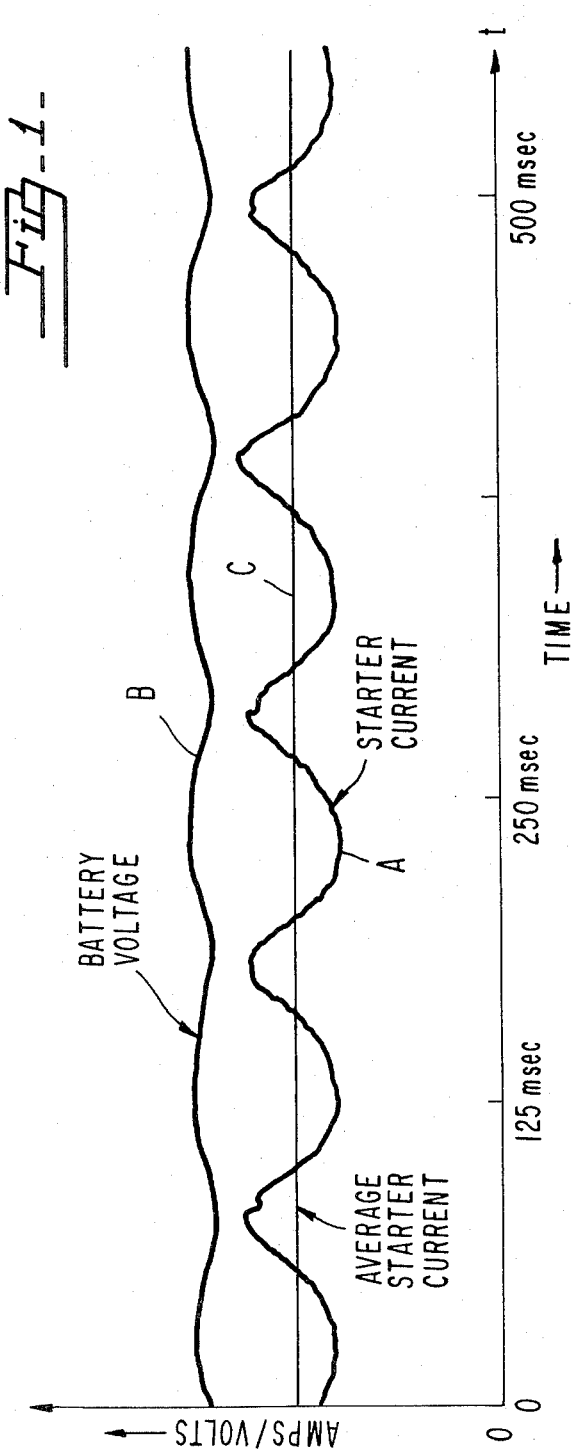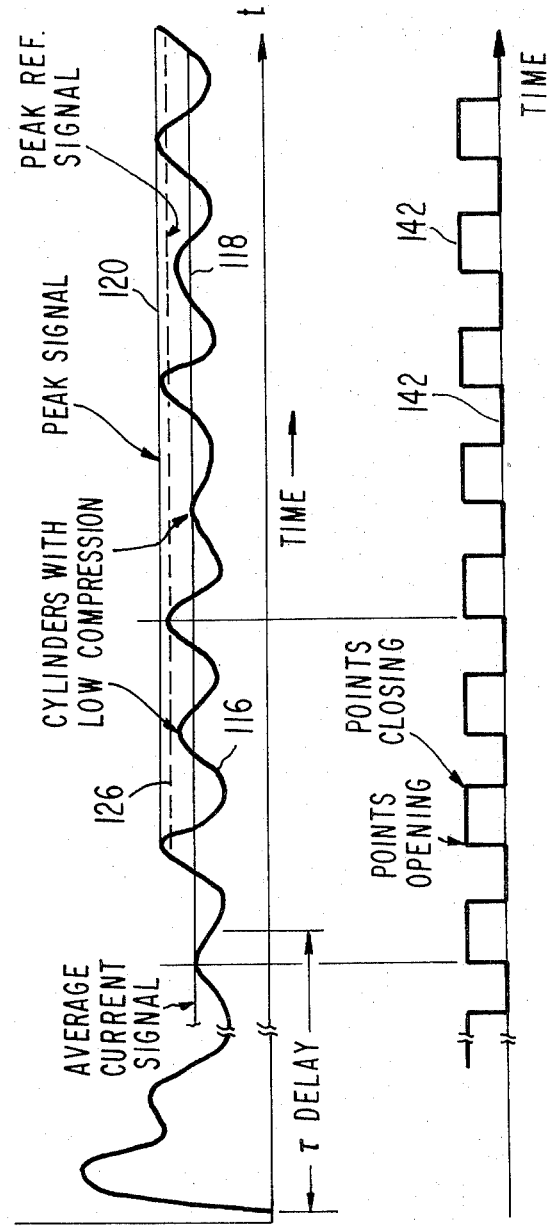

APPARATUS FOR ENGINE COMPRESSION TESTING

The invention herein described was made in the course of or under a contract or subcontract thereunder with the Department of the Army.

BACKGROUND OF THE INVENTION

This invention relates to engine compression testing apparatus and, more particularly, to apparatus which detects compression faults by detecting and evaluating the starter motor current during an engine cranking period.

In the prior art, conventional compression testing on reciprocating internal combustion engines requires connecting a pressure gauge to each cylinder in succession. The engine is then cranked with the starter motor while cylinder combustion is inhibited. This process is repeated for each cylinder, and the peak pressures measured with the gauge are compared with predetermined test limits. If either an excessive difference in compression exists between any two cylinders, or the average compression is below a predetermined value, one or more engine faults are indicated. These faults result from: worn piston ring or cylinders; cracked pistons or cylinder block; misadjusted, worn, or cracked valve; or a defective cylinder head or cylinder head gasket. Accordingly, the compression test is very useful in indicating this class of basic engine faults. However, the time and inconvenience required to perform the test, combined with the requirement to remove all of the spark plugs or fuel injectors on most engines, results in reluctance on the part of the mechanic or operator to perform the test routinely unless specific performance complaints or fault symptons indicate the unavoidable need for such testing.

In the present invention, however, engine compression faults are determined by evaluating the dynamic starter system electrical parameters during the cranking period. Accordingly, the present invention indicates a basic engine fault, of the type requiring maitenance action, due to either low overall compression or to a relative unbalance between individual cylinders.

SUMMARY OF THE INVENTION

Briefly, the present invention provides apparatus for testing engine compression for use with an internal combustion engine having at least two cylinders and having a starter motor and an electrical starter system which supplies starter current to the starter motor during a cranking period. The apparatus comprises means for detecting the starter motor current waveform to provide a compression signal having a time-varying component indicative of the engine cylinder compression cycles. The apparatus includes means for producing a first signal indicative of the average magnitude of the compression signal, and means for producing a second reference signal related to the maximum peak magnitude of the compression signal. Means are provided for comparing the second signal to the compression signal to provide a first fault signal if the magnitude of the compression reference signal exceeds the peak magnitude of any one cylinder compression peak. The apparatus further includes means for producing a difference signal indicative of the magnitude difference between the first and second signals, and means for comparing the difference signal to a predetermined reference signal to provide a second fault signal if the reference signal exceeds the difference signal. Means are responsive to at least one of the first and second fault signals for providing a fault indication.

BRIEF DESCRIPTION OF THE DRAWING

The advantages of this invention will become more readily appreciated as the same becomes better understood by reference to the following detailed description when taken in conjunction with the accompanying drawing wherein:

FIG. 1 is a graphic representation which illustrates the starter motor current waveform character istics and battery voltage waveform as taken from an actual engine;

FIGS. 3a and 3b illustrate waveform and signal levels useful in explaining the operation of the embodiment of the present invention depicted in FIG. 2.

DETAILED DESCRIPTION

Figure 2:
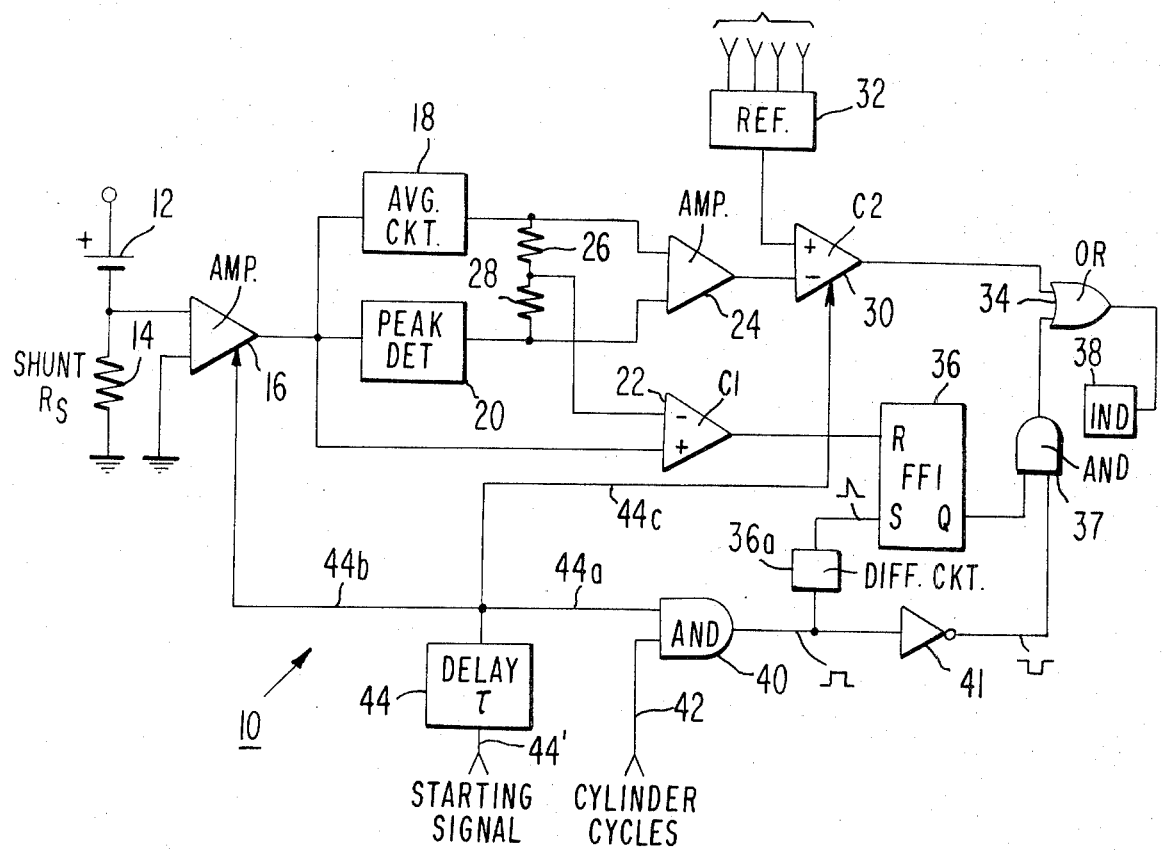
FIG. 2 is a combined block and schematic diagram of a preferred embodiment of the present invention.

FIG. 1 illustrates a typical starter current and battery voltage waveform for a known good or acceptable engine. The compression information is contained in the steady-state portion of the waveform after decay of the initial starter current peak or transient. The positive portion of the AC or time-varying component corresponds to the starter torque required to compress the air or air-fuel mixture in the compression stroke. A uniform compression loss in all cylinders reduces the total AC component of the waveform, while a compression loss in an individual cylinder will reduce the peak current related to the compression stroke for the particular cylinder. In accordance with the present invention, this information-bearing starter motor current waveform is advantageously utilized in the engine compression fault detector described hereinafter with reference to FIG. 2.

Referring now to FIG. 2 there is provided a diagrammatic illustration of an engine compression fault detector 10. Detector 10 is shown in conjunction with a battery 12 and a shunt 14 as would be provided in a typical engine starter motor electrical system. The positive terminal of battery 12 is adapted for coupling to a starter motor (not shown) by way of a solenoid switch (not shown). The negative terminal of battery 12 is coupled to ground by way of shunt 14. Shunt 14, which functions to provide a signal indicative of the starter motor current waveform, typically takes the form of a relatively small resistance, such as, for example, a resistance device constructed to develop 100mv when passing 50 amps of current. However, it will be appreciated by those skilled in the art that various other means for detecting the starter motor current waveform may be provided. For example, a current probe which is inductively or directly coupled to the starter motor input lead, or battery lead, may be utilized in order to provide a similar signal. Further, even the battery cable itself, since it too exhibits a small but finite resistance, can be utilized as a suitable shunt resistance.

The signal developed across shunt 14 is coupled as a first input to differential amplifier 16. The second input of amplifier 16 is coupled to ground. Accordingly, the output of amplifier 16 provides an amplified version of the signal developed by shunt 14. The output of amplifier 16 is coupled as an input to an averaging circuit 18, a peak detector 20 and a first input of a comparator 22.

The output of averaging circuit 18 is coupled as a first input to a differential amplifier 24, and the output of peak detector 20 is coupled as a second input to amplifier 24. The outputs of circuit 18 and detector 20 are interconnected by way of serially coupled resistors 26 and 28. The junction of resistors 26 and 28 is coupled as a second input to comparator 22. The output of differential amplifier 24 is coupled as a first input to a comparator 30. The second input to comparator 30 is provided by reference means 32. The output of comparator 30 is coupled as a first input to OR gate 34.

The output of comparator 22 is coupled to a reset (R) input of a bistable multivibrator or set-reset (RS) flip-flop 36. A "true" or Q output of flip flop 36 is coupled to the second input of OR gate 34 by way of a first input of an AND gate 37. The output of OR gate 34 is coupled to indicator means 38. A set (S) input of flip flop 36 is coupled to the output of an AND gate 40 by way of a differentiating circuit 36a. The output of AND gate 40 is also coupled to a second input of AND gate 37 by way of an inverter 41.

A first input of AND gate 40 is coupled to an input lead 42. Input lead 42 is adapted to receive signals indicative of engine cylinder cycles as described more fully hereinafter. The second input of AND gate 40 is coupled to an output of a delay means 44 by way of lead 44a. The output of delay means 44 is also coupled to a gating input of amplifier 16 by way of lead 44d, and to a gating input of comparator 30 by way of lead 44c. The input of delay means 44 is coupled to an input lead 44'. Input lead 44' is adapted to receive a starting signal indicative of a starter motor cranking period.

Referring now in more detail to the operation of a compression fault detector of FIG. 2, reference is now made to FIGS. 3a and 3b wherein there are shown waveforms appearing at various locations in the circuit of FIG. 2. The waveforms in FIGS. 3a nd 3b are identified by a numerical reference character that is 100 larger than the numerical reference character indentifying the associatd component of FIG. 2 that produces that waveform. For example, waveform 116 of FIG. 3a corresponds to the output of amplifier 16 of FIG. 2.

The operation of detector 10 begins when a starting signal is applied to input lead 44' of delay means 44. This starting signal may be derived rrom, for example, the starter switch of the starter motor system or any other suitable means which provides an indication that a cranking period has begun. Delay means 44 may comprise a monostable multivibrator or any other suitable means for providing a predetermined delay or timing signal in response to an input signal. The purpose of this delay function is to permit the starter motor current waveform to reach its steady-state value (after the initial current peak or transient) before detector 10 functions to detect and evaluate the starter motor current. Accordingly, since delay means 44 enables enables detec5or 10 only after the initial starter transient has decayed, testing during valid portions of the starter motor operation is assured. In the embodiment of FIG. 2, delay means 44 provides a logic 0 output for a predetermined time period $\tau$, in repsonse each starting signal, which, in turn, is used to inhibit the outputs of amplifier 16 and comparator 30. After the predetermined time period $\tau$, delay means 44 provides a logic 1 at its output which acts to enable or gate amplifier 16 and comparator 30 to provide respective outputs therefrom.

The logic 1 output from delay means 44 also acts to enable or gate AND gate 40 to provide an output therefrom when a signal is applied to input lead 42. The signals applied to input 42 are indicative of engine cylinder cycles. These input signals provide information related to engine cylinder compression cycles. The maximum compression peaks normally occur near "top-dead-center" and the ignition system breaker points are normally adapted to open near top-dead-center. Accordingly, these input signals can be derived from the operation of the breaker points. Waveform 142 of FIG. 3b represents the operation of the breaker points and other wise represents the signals as would be provided at input lead 42 of FIG. 2. It can be seen, by reference to FIGS. 3a and 3b, that the breaker points open each time an engine cylinder compression piak occurs. It will be appreciated by those skilled in the art however, that the signals depicted by waveform 142 of FIG. 3b can be derived from other means such as, for example, a magnetic pick-up device which is magnetically coupled to a moving member of the engine. Futher, the signals can also be provided by detecting the starter current waveform itself. For example, various means can be provided to detect the peaks or the valleys of the starter motor current waveform, thereby eliminating the need for a separate cylinder cycle input signal.

The output of amplifier 16 provides a steady-state compression signal having an AC or time-varying component related to the engine cylinder compression cycles. The steady-state compression signal 116 provided by amplifier 16 is filtered by averaging circuit 18 to provide an average signal 118 which is indicative of the average magnitude of the steady-state compression signal. Peak detector 20 functions to provide a peak signal 120 indicative of the highest engine cylinder compression peak in the compression signal. The structure of circuit 18 and peak detector 20 may each comprise a simple R-C time-constant circuit, an operation amplifier with appropriate feedback, or any other suitable means.

Since the outputs of circuit 18 and detector 20 are intercoupled by means of serially connected resistors 26 and 28, the signal at their junction (126) exhibits a magnitude which is not only indicative of the DC component of the compression signal 116, but is also indicative of the difference between the peak signal 120 and the average signal 118. In currently preferred practice, the values of resistors 26 and 28 are selected to provide a peak reference signal 126 whose magnitude is less than the magnitude of the peak signal 120 by a value which is 40 percent of the difference between the peak signal 120 and the average signal 118. Thus, peak reference signal 126 provides a dynamic reference signal which is derived from and related to the maximum cylinder compression peak of the engine under test. In FIG. 3a, waveforms 116, 118, 120 and 126 show the relationships of the compression signal, the average signal, the peak signal and the peak reference signal respectively.

Comparator 22 functions to compare the peak reference signal 126 provided at the junction of resistors 26 and 28 to the compression signal 116 provided by amplifier 16. It should be noted that since peak reference signal 126 and compression signal 116 each reflect the same DC components, the comparison function provided by comparator 22 is independent of the DC component. Thus, the comparison function is nearly independent of engine parameters, such as friction torque and oil viscosity, which primarily effect the DC component of the starter motor current waveform. It will be appreciated by those skilled in the art, however, that this DC independence feature of the present invention can be accomplished by means other than the exemplary embodiment of FIG. 2.

When the magnitude of any one cylinder peak in the compression signal exceeds the peak reference signal, comparator 22 provides a logic 1 at its output during the time interval when this ocndition exists. Since the output of comparator 22 is coupled to the reset, or R, input of flip-flop 36, a logic 1 output will reset flip-flop 36 wherein a logic 0 is provided at its Q output.

When the breaker points open, as depicted by the leading edge of each pulse of waveform 142, the output of AND gate 40 provides a logic 1 for the duration of the pulse, and differentiating circuit 26a coupled a momentary logic 1 to the set, or S, input of flip-flop 36. Thereafter, the Q output of flip-flop 36 provides a logic 1 output to the first input of AND gate 37. During the interval when the output of AND gate 40 is a logic 1, inverter 41 applies a logic 0 to the second input of AND gate 37 which holds its output logic 0 for the duration of the pulse. When the breaker points close, the output of AND gate 40 provides a logic 0 to inverter 41 which, in turn, applies a logic 1 to the second input of AND gate 37. With a logic 1 applied to the second input of AND gate 37 its output will provide the logic 1 to OR gate 34 if flip-flop 36 has not been reset by a logic 1 output from comparator 22. If however, the magnitude of the cylinder peak in the compression signal exceeds the magnitude of the peak reference signal during the duration of the pulse, flip-flop 36 will be reset thereby providing a logic 0 at its Q output. Thus, if at the end of each cylinder cycle pulse period, a logic 1 is provided at the output of flip-flop 36 and therefore the output of AND gate 37, the output of OR gate 34, in turn, provides a logic 1 which activates indicator means 38. Accordingly, the output of OR gate 34 provides a first fault signal if the magnitude of the peak reference signal exceeds the peak magnitude of any one cylinder peak in the compression signal.

Differential amplifier 24 functions to provide a difference signal indicative of the magnitude difference between the average signal 118 and peak signal 120. Comparator 30 functions to compare the difference signal to a predetermined reference signal provided by reference means 32. If the reference signal exceeds the difference signal, comparator 30 provides a logic 1 input to OR gate 34. Accordingly, when the reference signal, provided by means 32, exceeds the difference signal, provided by amplifier 24, the output of OR gate 34 provides a second fault signal which activates indicator means 38.

Reference means 32 preferably provides a plurality of given fixed reference signals to accomodate variations between different engine and starter types. That is, the difference between the peak and average starter current values may differ between different engine and starter types. Accordingly, each one of the plurality of reference signals is selected to accomodate a particular known-good engine and starter type.

Indicator means 38 preferably takes the form of a "latch" circuit such as, for example, a set-reset flip flop. Although detector 10 of FIG. 2 combines both fault signals by way of OR gate 34, it will be appreciated by those skilled in the art that separate indicator means can be provided for each fault signal. The separate indicator means would provide additional information, to the mechanic or operator, as to the type of basic engine fault detected. Further, although not shown in FIG. 2, in currently preferred practice detector 10 includes additional interlock circuitry. For example, an interlock is provided to assure that the engine temperature is within a desired operating range. Also, in currently preferred practice, engine compression fault detector provides an additional output signal which is used to disable cylinder combustion during the cranking evaluation period. Otherwise, if a cylinder does fire, the crankshaft would receive a torque contribution from a source in addition to the starter motor. This would then cause a reduction in the current requirement from the motor and which could be interpreted as a compression loss. On combustion-ignition (CI) engines, this function is accomplished by interlocking the fuel shut off rod or solenoid. On spark ignition (SI) engines, this same function is accomplished by cranking the starter motor with the ignition switch in the off position or by otherwise disabling the ignition operation.

It should be noted that variations in engine friction torque, due to oil viscosity, mechanical clearances or wear, primarily affect the DC component of the starter current waveform and have only negligible effects on the AC or time-varying component. Since the preferred embodiment of the present invention compares each cylinder compression peak to a limit derived from and related to the highest compression peak independently of the DC component, the detection process is, accordingly, independent of engine type and variations in parameters which primarily affect the DC component of the waveform. Likewise, the average current to maximum peak current comparison is also independent of the parameters which primarily affect the DC component of the waveform. Although the preferred embodiment of the present invention utilizes a starter motor current waveform, it should be noted that a suitable waveform can also be derived from the battery voltage waveform. That is, since the battery of the starter electrical system exhibits internal resistance, the same basic waveform is reflected as an inverted signal superimposed on the battery voltage. Thus, the starter motor current waveform can be detected from the battery voltage waveform.

What has been taught, then, is an engine compression fault detector facilitating, notably, detection of individual cylinder compression faults and overall engine compression evaluation. The form of the invention illustrated and described herein is a preferred embodiment of the teachings. It is shown as an illustration of the inventive concept, however, rather than by way of limitation, and it is pointed out that various modifications and alterations may be indulged in within the scope of the appended claims.

What is claimed is:

1. Apparatus for testing engine compression for use with an internal combustion engine having at least two cylinders and said engine having a starter motor and an electrical starter system which supplies starter current to said starter motor during a cranking period, said apparatus comprising, in combination:

means for detecting the starter motor current waveform to provide a compression signal having a time-varying component indicative of the engine cylinder compression cycles;

means for producing a first signal indicative of the average magnitude of the compression signal;

means for producing a second signal related to the maximum peak magnitude of said compression signal;

means for comparing said second signal to said compression signal to provide a first fault signal if the related maximum peak magnitude of the compression signal exceeds the peak magnitude of any one cylinder compression peak;

means for producing a difference signal indicative of the magnitude difference between said first and second signals;

means for providing a reference signal representative of a given magnitude difference between said first and second signals;

means for comparing said difference signal to said reference signal to provide a second fault signal if said given magnitude difference exceeds the magnitude difference between said first and second signals; and means responsive to at least one of said first and second fault signals for providing a fault indication.

2. The apparatus according to claim 1, including:

means for providing a starting signal indicative of said cranking period; and delay means responsive to said starting signal for inhibiting said first and second fault signals during a predetermined initial portion of said cranking period.

3. The apparatus according to claim 1, wherein said second signal is derived from said compression signal.

4. The apparatus according to claim 3, wherein the magnitude of said second signal is a predetermined portion of the maximum peak magnitude of said compression signal.

5. The apparatus according to claim 1, including:

means for detecting the cylinder cycles of said engine to provide a speed signal representative thereof; and means coupled to said means for comparing said second signal to said compression signal and responsive to said speed signal, for comparing said second signal to said compression signal only during a portion of each cylinder cycle.

6. The apparatus according to claim 1, wherein said means for producing a difference signal comprises a differential amplifier having first and second inputs respectively coupled to said means for producing said first signal and said means for producing said second signal, said differential amplifier having an output coupled to said means for comparing said difference signal to said reference signal.

7. The apparatus according to claim 6, including divider means coupled to said means for producing said first signal and said means for producing said second signal, said divider means providing a peak reference signal indicative of the difference between said first and second signals, and said peak reference signal being coupled to said means for comparing said second signal to said compression signal, thereby to provide said first fault signal if the magnitude of said peak reference signal exceeds the peak magnitude of any one cylinder compression peak.

8. The apparatus according to claim 1, wherein:

said means for producing said second signal comprises a peak detector having an input coupled to receive said compression signal and said peak detector having an output; and said means for comparing said second signal to said compression signal comprises a comparator having a first input coupled to the output of said peak detector and said comparator having a second input coupled to receive said compression signal.

9. The apparatus according to claim 3, including a resistive divider coupled between the output of said peak detector and said first input of said comparator, so that said second signal at said first input is a predetermined portion of said maximum peak magnitude of said compression signal.

10. The apparatus according to claim 1, including means for inhibiting engine cylinder combustion during said cranking period.

* * * * *